Patented Dec. 6, 1927.

1,651,991

UNITED STATES PATENT OFFICE.

PAUL BERTHON, OF LYON, FRANCE, ASSIGNOR TO SOCIÉTÉ DE STEARINERIE & SAVONNERIE DE LYON, OF LYON, FRANCE.

PROCESS OF MAKING SOLUBLE MIXED LOW AND HIGH FATTY ACID ESTERS OF CELLULOSE.

No Drawing. Original application filed February 12, 1924, Serial No. 692,440, and in France July 31, 1923. Divided and this application filed May 8, 1925. Serial No. 28,960.

This is a division of my co-pending patent application Serial No. 692,440, filed February 12, 1924, in which I have described a process for obtaining mixed soluble cellulosic esters consisting in heating mineral acid cellulose esters together with chlorides of the higher fatty acids in the presence of pyridine and benzene.

The present invention consists in a modification of the process wherein instead of mineral acid cellulose esters, organic acid cellulose esters, other than higher fatty acid esters, are treated.

The following is an example of the process:—

100 grams of diaceto-cellulose is dissolved in 200 grams of pyridine and a solution of 320 grams of chloride of lauryle in 300 grams of toluene is added. The mixture is heated for half an hour to an hour to a temperature of 40–45° C.

The pasty mass obtained is precipitated by alcohol and then purified by redissolving in benzene and re-precipitation of the benzenic solution by alcohol.

The output is 80%. The laurodiacetocellulose is produced in the form of filaments and is soluble in hydrocarbons of the aromatic series similarly to the mixed cellulosic esters of the higher fatty acids described in my aforesaid application Serial No. 692,-440; the resistance to traction is however greater.

The mixed esters obtained differ from the known mixed esters of the lower fatty acids such as nitro-acetates in that they are soluble in the aromatic series of hydrocarbons and are also of greatly reduced inflammability.

What I claim as my invention and desire to secure by Letters Patent of the United States is:—

1. A process for manufacturing mixed cellulose esters soluble in hydrocarbons of the aromatic series consisting in heating low organic acid cellulose esters, other than higher fatty acid esters, together with chlorides of the higher fatty acids in the presence of pyridine and benzenic hydrocarbons precipitating the mass at the end of the reaction by alcohol and purifying the product obtained.

2. Process for manufacturing mixed cellulose esters soluble in hydrocarbons of the aromatic series consisting in dissolving diacetocellulose in pyridine adding a solution of chloride of lauryl in toluene, heating the mixture, precipitating the mass at the end of the reaction by alcohol, purifying the product by redissolving in benzene and precipitating the benzene solution by alcohol.

In witness whereof I have signed this specification.

PAUL BERTHON.